(12) United States Patent
Browne et al.

(10) Patent No.: US 6,571,161 B2
(45) Date of Patent: May 27, 2003

(54) PRE-CRASH ASSESSMENT OF CRASH SEVERITY FOR ROAD VEHICLES

(75) Inventors: Alan Lampe Browne, Grosse Pointe, MI (US); Francis D. Wood, Detroit, MI (US); Osman D. Altan, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 26 days.

(21) Appl. No.: 09/782,461

(22) Filed: Jan. 22, 2001

(65) Prior Publication Data

US 2002/0099485 A1 Jul. 25, 2002

(51) Int. Cl.[7] ................................................. G06K 9/00
(52) U.S. Cl. ....................... 701/45; 701/301; 280/728.1; 382/104
(58) Field of Search ......................... 701/45, 301, 200, 701/213, 214; 340/436; 280/728.1, 734, 735; 180/272; 382/104

(56) References Cited

U.S. PATENT DOCUMENTS

| | | | |
|---|---|---|---|
| 3,097,354 A | 7/1963 | Blowney et al. ............ 342/30 |
| 4,714,925 A | 12/1987 | Bartlett .................... 340/10.33 |
| 5,317,309 A | 5/1994 | Vercellotti et al. .......... 340/10.5 |
| 5,325,302 A * | 6/1994 | Izidon et al. ............... 701/301 |
| 5,508,920 A | 4/1996 | Gioutsos et al. ............. 701/45 |
| 5,540,461 A | 7/1996 | Nitschke et al. ............ 280/735 |
| 5,546,311 A | 8/1996 | Sekine ...................... 701/208 |
| 5,563,589 A | 10/1996 | Blaimont et al. ......... 340/10.34 |
| 5,684,474 A | 11/1997 | Gilon et al. ................ 340/903 |
| 5,748,477 A | 5/1998 | Katoh ........................ 701/301 |
| 5,785,347 A | 7/1998 | Adolph et al. .............. 280/735 |
| 5,787,377 A | 7/1998 | Watanabe et al. ............. 701/45 |
| 5,835,007 A * | 11/1998 | Kosiak ...................... 340/436 |
| 5,841,367 A | 11/1998 | Giovanni .................... 340/903 |
| 5,845,000 A | 12/1998 | Breed et al. ................ 382/100 |
| 5,964,817 A | 10/1999 | Dalum et al. ................. 701/45 |
| 5,983,161 A * | 11/1999 | Lemelson et al. .......... 701/301 |
| 5,999,871 A | 12/1999 | Liu ............................. 701/45 |
| 6,012,008 A | 1/2000 | Scully ......................... 701/45 |
| 6,087,928 A * | 7/2000 | Kleinberg et al. .......... 340/435 |
| 6,163,755 A * | 12/2000 | Peer et al. .................. 701/301 |
| 6,226,389 B1 * | 5/2001 | Lemelson et al. .......... 382/104 |
| 6,226,572 B1 * | 5/2001 | Tojima et al. ................ 701/23 |
| 6,275,773 B1 * | 8/2001 | Lemelson et al. .......... 701/301 |
| 6,317,691 B1 * | 11/2001 | Narayan et al. ............. 701/301 |

* cited by examiner

*Primary Examiner*—William A. Cuchlinski, Jr.
*Assistant Examiner*—Marthe Marc-Coleman
(74) *Attorney, Agent, or Firm*—Kathryn A. Marra

(57) ABSTRACT

A method of pre-crash prediction of the severity of an imminent crash of road vehicles is disclosed using a pre-crash sensor, a computer system coupled with pre-crash vehicle condition signal sources and a vehicle communication system onboard each of two vehicles involved in a crash. The method includes the steps of determining that a collision of the vehicles is imminent, exchanging vehicle crash-related information between the vehicles when an imminent collision is determined, computing crash-defining information onboard each vehicle and predicting onboard each vehicle the severity of the imminent collision whereby occupant protection devices of the vehicles may be deployed in accordance with the predicted severity.

18 Claims, 1 Drawing Sheet

PRE-CRASH ASSESSMENT OF CRASH SEVERITY FOR ROAD VEHICLES

TECHNICAL FIELD

This invention relates to pre-crash warning systems for road vehicles. More particularly, it relates to a system for robustly assessing the expected severity of an impending crash of two vehicles.

BACKGROUND OF THE INVENTION

In currently-available pre-crash warning systems for road vehicles, the safety benefits are limited because such systems do not provide sufficient information about the object in the path of the vehicle to reliably predict the severity of an imminent crash. For example, currently-available systems cannot distinguish between two vehicles which are about the same size but which have significantly different mass and hence have critically different crash characteristics. Consequently, the safety benefits of such pre-crash warning systems are limited to (1) pre-arming of non-resettable devices, such as airbags, so that they can be deployed more rapidly in cases where the subsequent collision is sufficiently severe to warrant deployment, and (2) triggering non-aggressive resettable safety devices that do not interfere with the vehicle driving function, such as extendible/retractable bumpers and extendible/retractable knee bolster systems. There is a need for pre-crash warning systems which not only give warning of an imminent crash but also predict the severity of the crash.

In the prior art, the Sekine U.S. Pat. No. 5,546,311 granted Aug. 13, 1996 describes an intercommunication system for vehicles which supplies speed and direction information for the purpose of collision avoidance.

Other prior art patents relating to collision avoidance systems are Blowney et al U.S. Pat. No. 3,097,354 granted Jul. 9, 1963; Gilon et al U.S. Pat. No. 5,684,474 granted Nov. 4, 1997 and Giovanni U.S. Pat. No. 5,841,367 granted Nov. 24, 1998.

The known prior art does not disclose a system for exchanging critical vehicle crash-defining information between two vehicles in an imminent crash situation, predicting the severity of the crash and controlling occupant protection devices in accordance with the prediction.

SUMMARY OF THE INVENTION

In accordance with this invention, a system is provided which predicts the severity of an imminent collision of two vehicles based upon robust crash-defining information about both vehicles.

Further, in accordance with the invention, the robust crash-defining information about both vehicles is developed after the collision becomes inevitable and imminent. Further, the prediction of crash severity is developed in time so that occupant safety devices can be deployed in accordance with the predicted crash severity.

Further, in accordance with this invention, road vehicles are provided with pre-crash warning systems with automatic means for exchanging critical vehicle crash information between two vehicles when a collision between the two vehicles is determined to be inevitable and imminent. The critical information is used to deploy non-reversible and reversible safety systems when a collision is imminent.

Further, in accordance with this invention, a method of predicting the severity of an imminent collision of two vehicles is provided whereby occupant protection devices of the vehicles may be deployed in accordance with the predicted severity. The method comprises the steps of determining that a collision of the vehicles is imminent, exchanging vehicle crash-related information between the vehicles, computing crash-defining information onboard each vehicle based upon the crash-related information and predicting onboard each vehicle the severity of the imminent collision based upon the computed crash-defining information.

Further, in accordance with this invention, apparatus for use onboard a road vehicle is provided for predicting the severity of an imminent collision and for controlling deployment of occupant protection devices in accordance with the prediction. The apparatus comprises means for determining whether the vehicle is closing on another vehicle and for producing a warning signal when a collision of the two vehicles is imminent, means responsive to the warning signal for transmitting crash-related information to the other vehicle, means for receiving crash-related information from the other vehicle, and computer means for processing said crash-related information from both vehicles and for predicting the severity of the collision, whereby the occupant protection devices may be deployed in accordance with the severity.

Further, in accordance with this invention, the critical information is exchanged between the two vehicles by means such as electromagnetic, optical or ultrasonic systems. Alternatively, the critical information is exchanged by use of satellite-based systems or by use of radio transceiver or transponder systems.

A complete understanding of this invention may be obtained from the detailed description that follows taken with the accompanying drawings.

DESCRIPTION OF THE PREFERRED EMBODIMENT

Figure 2:
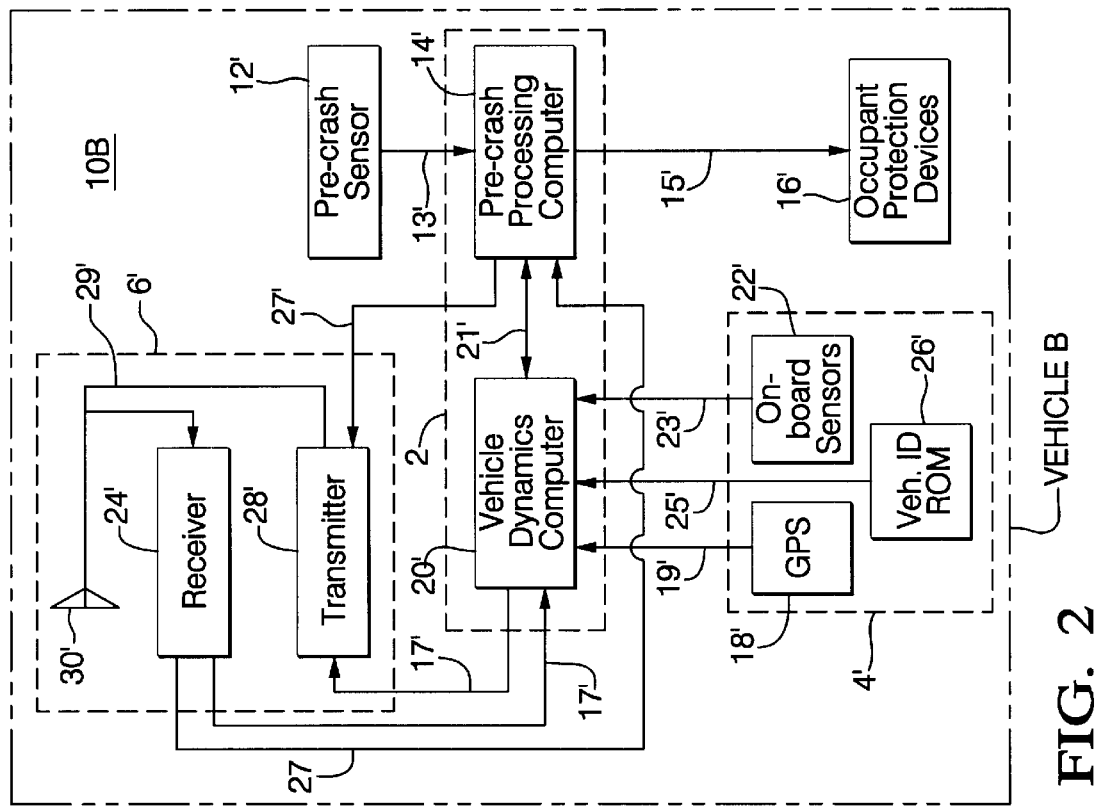
FIG. 2 is a functional block diagram of a crash severity prediction system which is identical to that of FIG. 1 but is installed in a second road vehicle.

Referring now to the drawings, there is shown an illustrative embodiment of the invention which is adapted for use in controlling the deployment of passenger protection devices in land vehicles. It will be appreciated, as the description proceeds, that the invention is useful in a wide variety of applications and may be implemented in many different ways.

Figure 1:
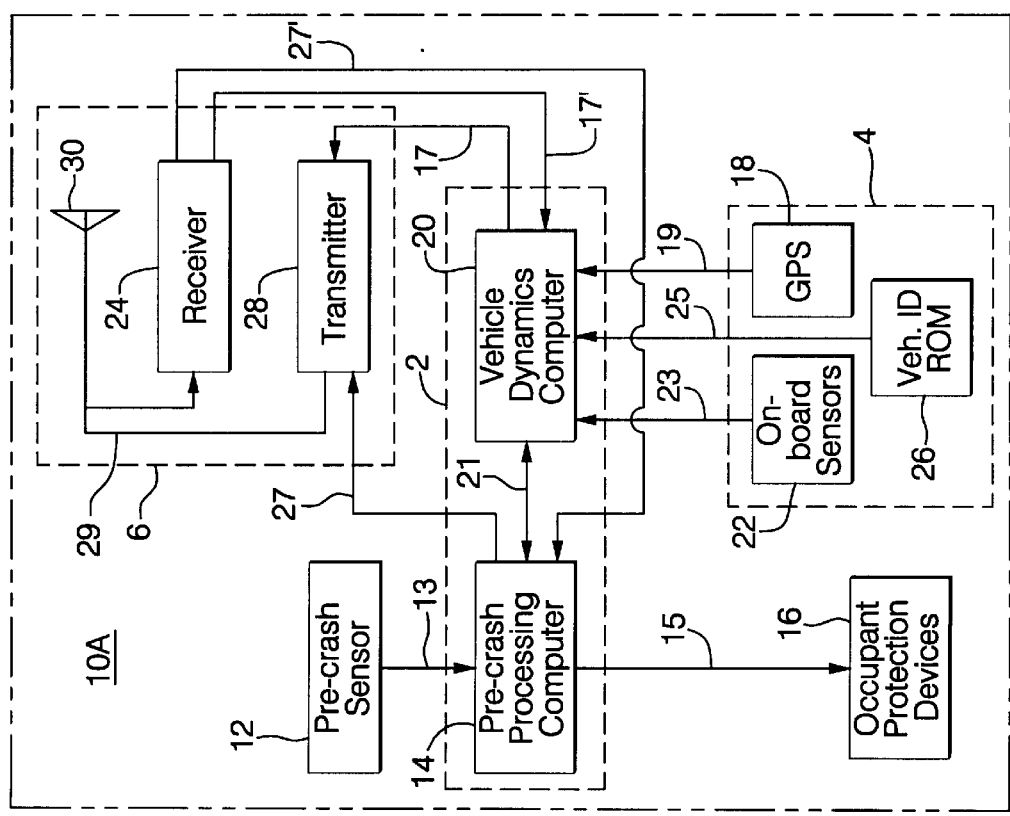
FIG. 1 is a functional block diagram which shows a crash severity prediction system installed in a first road vehicle.

FIG. 1 is a block diagram representation of a crash severity prediction system 10A which is installed in a vehicle A, and FIG. 2 is block diagram of an identical crash severity prediction system 10B installed in vehicle B. The crash severity prediction system 10A will be described with reference to FIG. 1; the description is applicable also to the crash severity prediction system 10B. The corresponding components of systems 10A and 10B are identified by the same reference characters except that a prime symbol is added to the reference characters in system 10B.

General Description of the Crash Severity Prediction System

An overview of the crash severity prediction system 10A will be given before the system is described in detail. The system 10A comprises, in general, a computer system 2, a pre-crash sensor 12 and a communication system 6 which communicates with vehicle B. The pre-crash sensor 12 supplies the computer system 2 with closing speed, range and, optionally, the angle of approach between vehicles A and B. The computer system 2 also receives crash-related vehicle information including vehicle crash characteristics, vehicle speed, heading and the operating status of the brakes, steering wheel and the like, which are referred to collectively as pre-crash vehicle condition signals 4. The computer system 2 predicts the severity of an imminent crash based upon the signals received from the pre-crash sensor 12 and the signals 4. It also develops control signals for occupant protection devices 16.

The computer system 2 comprises a vehicle dynamics computer 20 and a pre-crash processing computer 14. The vehicle dynamics computer 20 receives the pre-crash vehicle condition signals 4 and operates on the signals to develop vehicle A condition-defining signals 17. Also, the vehicle dynamics computer 20 receives vehicle B condition-defining signals 17' via the vehicle A communication system 6. The vehicle dynamics computer 20 processes the vehicle A and vehicle B condition-defining signals 17 and 17' to develop vehicle A crash-defining data signals 21 which are applied to the pre-crash processing computer 14.

The pre-crash processing computer 14 receives a pre-crash warning signal 13 from the pre-crash sensor 12 and generates an alert or handshake signal 27 to initiate communication with vehicle B. The pre-crash processing computer 14 processes the crash-defining data signals 21 to assess the severity of the impending collision and to generate control signals 15 for controlling deployment of the occupant protection devices 16.

The communication system 6 of vehicle A comprises transmitter 28 for transmitting signals to vehicle B and comprises receiver 24 for receiving signals from vehicle B. Preferably, the transmitter and receiver operate in the manner of either a transceiver or a transponder.

Description of Individual Stages

The individual stages of crash-sensing prediction system 10A will now be described further in regard to function and implementation. Since the required functions of each individual stage can be realized by known designs using readily-available components, details of circuitry and structure will not be given. However, it will be helpful to provide further description, especially in respect to the function of each individual stage and the functional relationship among the different stages.

Pre-Crash Sensor

The pre-crash sensor 12 in the illustrative embodiment of FIG. 1 develops closing speed and range signals and, optionally, the angle of approach between vehicles A and B.

These signals are used to produce the pre-crash warning signal 13 when the sensed conditions indicate that a crash of the vehicles A and B is imminent. The pre-crash warning signal is applied to the pre-crash processing computer 14.

The pre-crash sensor 12 is suitably a collision-sensing system of the type using radar or lidar or of the type using ultrasonics. The collision-sensing system itself must be capable of measurements in the near range of 0 to 20 meters for use in assessing crash severity. Radar systems in the 20 GHz range or higher, lidar systems, and also ultrasonic systems are known having this capability.

Pre-Crash Processing Computer

The pre-crash computer 14 is a digital computer which computes an assessment of the severity of an imminent collision based upon crash-defining data signals 21 from the vehicle dynamics computer 20 which represent the relative speed, angle and location of impact, energy levels of the vehicles and, if available, crush forces associated with those locations of impact. Based upon the data signals 21, the pre-crash processing computer 14 computes a prediction of the severity of an imminent crash and produces control signals 15 for controlling actuation of occupant protection devices 16 which may include but are not limited to airbags, seat belts, extendible/retractable bumpers and knee bolsters.

The pre-crash processing computer 14 is operative in response to the pre-crash warning signal 13 from the pre-crash sensor 12 to generate a handshake signal 27 which is applied to the transmitter 28 for transmission to vehicle B. This initiates transmission from vehicle B of a return handshake signal 27' (generated by the pre-crash processing computer 14') to vehicle A which is supplied by the receiver 24 to the pre-crash processing computer 14. Upon receipt of the return handshake signal, the vehicle dynamics computer 20 is activated to exchange vehicle condition-defining signals 17 and 17' with vehicle dynamics computer 20'.

Vehicle Dynamics Computer

The vehicle dynamics computer 20 is a digital computer which receives the pre-crash vehicle condition signals 4 and develops the crash-defining data signals 21 which are supplied to the pre-crash processing computer 14. The pre-crash vehicle condition signals 4 are supplied from a vehicle identification read only memory (ROM) 26, onboard sensors 24 and, optionally, a global positioning system (GPS). The information obtained from these sources taken with that from the pre-crash sensor is sufficient for the vehicle dynamics computer 20 to develop the vehicle A condition defining signals 17.

The vehicle A condition-defining signals 17 are applied to transmitter 28 which transmits the signals to the receiver 24' of vehicle B and thence the signals 17 are applied to the vehicle dynamics computer 20'.

Vehicle dynamics computer 20 also receives the vehicle B condition-defining signals 17' which are transmitted from vehicle B and applied to the receiver 24 and thence to the vehicle dynamics computer 20. The vehicle B condition-defining signals 17' contain crash-related information of the same type as that which is contained in the vehicle A condition-defining signals 17.

The vehicle dynamics computer 20 processes the vehicle condition-defining signals 17 and 17' of vehicles A and B and develops the crash-defining data signals 21 representing the relative speed, energy levels of the two vehicles, location of impact and, subject to data availability, crush forces that will be generated at such locations.

Pre-Crash Vehicle Condition Signals

The pre-crash vehicle condition signals 4 in the illustrative embodiment are supplied from the vehicle identification read only memory (ROM) 26, onboard sensors 22 and optionally a global positioning system 18.

The vehicle identification ROM 26 defines characteristics of vehicle A related to the crash worthiness of the vehicle. Such characteristics may include mass, dimensions and crash pulse of the vehicle. Vehicle identification signals 25 are read from the ROM 26 into the vehicle dynamics computer 20.

The global positioning system 18 is the On-Star™ system (made by General Motors Corporation) or equivalent and supplies vehicle condition defining signals 19 which enable the vehicle dynamics computer to develop position, heading and speed of the vehicle.

The on-board sensors 22 in the illustrative embodiment supply the vehicle dynamics computer 20 with signals 23 representing speed, acceleration, yaw rate, steering wheel position, braking status, throttle position, and transmission status.

The Communication System

In the illustrative embodiment of the invention, the communication system 6 comprises receiver 24 and transmitter 28. The receiver 24 and the transmitter 28 are preferably coupled in a manner so as to operate as a transceiver with the common antenna 30. The transmitter 28 receives signals 27 from the pre-crash processing computer 14 and also receives signals 17 from the vehicle dynamics computer 20 and transmits output signals 29 which are received by the receiver 24' of the crash severity prediction system 10B of vehicle B. The input signals to the transmitter 28 include the handshake signal 27 and the vehicle A condition-defining signal 17 from the vehicle dynamics computer 20. The receiver 24 is adapted to receive input signals including a handshake signal and the condition-defining signal 17' transmitted by the crash severity prediction system 10B of vehicle B. The process of exchanging information must be accomplished within a matter of milliseconds, such as a period of 10 to 20 milliseconds.

In an alternative communication system (not shown), information is exchanged between vehicles using the pre-crash sensor 12 and modulating its emitted carrier wave to represent the information to be exchanged.

As another alternative, exchanging information between the vehicles can be done, once an imminent collision has been detected, by using satellite-based systems such as the On-Star™ system.

Another alternative is a transponder system using a frequency band exclusively reserved for vehicle crash safety systems. In a transponder system, information is exchanged by a signal transmission from one vehicle to the other which triggers the automatic return of a signal transmission by a transponder on the other vehicle.

Occupant Protection Devices

The occupant protection devices 16 include but are not limited to non-resettable devices such as air bags and resettable safety devices such as extendable and retractable bumpers and extendable and retractable knee bolster systems. The timing and extent of deployment of each of these devices is controlled by control signals 15.

Operation of the Crash Severity Prediction System

It will be understood that the benefits of this invention cannot be realized unless both vehicles involved in an impending collision are equipped with the crash severity prediction system. Accordingly, the operation will now be described in the situation in which the two vehicles A and B are involved.

In the case where the two vehicles A and B are closing on each other, it will be assumed that the pre-crash sensor 12 of vehicle A is the first to transmit a pre-crash warning signal 13 when a crash of the vehicles is imminent. The pre-crash processing computer 14 supplies a handshake signal 27 to the transmitter 28, and the signal is detected by the receiver 24' of vehicle B. This causes the transmitter 28' of vehicle B to send a return handshake signal 27' which is detected by receiver 24 of vehicle A and applied to the pre-crash processing computer 14. This establishes communication between the vehicles with vehicle A having pre-empted the initiation of information exchange between them. The vehicle dynamics computer 20 of vehicle A responds to the return handshake signal by applying the vehicle A condition-defining signals 17 to the transmitter 28 which sends it to vehicle B which, in turn, applies the signal to the vehicle dynamics computer 20' of vehicle B. Immediately after vehicle B sends the return handshake signal, it also sends the vehicle B condition-defining signals 17' to vehicle A which applies those signals to the vehicle dynamics computer 20.

The vehicle dynamics computer 20 of vehicle A processes the vehicle A and vehicle B condition-defining signals 17 and 17' and develops the crash-defining data signals 21 which are applied to the pre-crash processing computer 14 of vehicle A. The pre-crash processing computer 14 processes the crash-defining data signals 21 to predict the severity of the imminent crash and to develop control signals 15 which determine the timing and extent of deployment of the associated occupant protection devices 16. Similarly, in vehicle B, the vehicle dynamics computer 20' processes the vehicle A condition-defining signals 17 and the vehicle B condition-defining signals 17' and develops the crash-defining data signals 21' which are applied to the pre-crash computer 14'. The pre-crash processing computer 14' predicts the severity of the imminent crash and develops the control signals 15' which determine the timing and extent of deployment of the associated occupant protection devices 16'.

CONCLUSION

A method of and apparatus for predicting the severity of an imminent collision of two vehicles is described above. The prediction of severity is early enough so that the timing and extent of deployment of occupant protection devices can be controlled in accordance with the predicted crash severity.

Although the description of this invention has been given in reference to a particular embodiment, it is not to be construed in a limiting sense. Many variations and modifications of the invention will now occur to those skilled in the art. For a definition of the invention, reference is made to the appended claims.

What is claimed is:

1. A method of predicting the severity of an imminent collision of first and second vehicles which are closing on each other, said method comprising the steps of:

determining that a collision of said vehicles is imminent, exchanging vehicle crash-related information between the vehicles when an imminent collision is determined, said crash-related information, for said first vehicle, being represented by first vehicle condition-defining signals developed onboard said first vehicle and, for said second vehicle, being represented by second vehicle condition-defining signals developed onboard said second vehicle, processing, onboard said first vehicle, said first and second vehicle condition-defining signals to obtain a first crash-defining data signal, processing, onboard said second vehicle, said first and second vehicle condition-defining signals to obtain a second crash-defining data signal, predicting onboard said first vehicle the severity of the imminent collision for said first vehicle based upon said first crash-defining data signal, and predicting onboard said second vehicle the severity of the imminent collision for said first vehicle based upon said second crash-defining data signal.

2. A method as defined by claim 1 wherein:

said step of determining that a collision of the vehicles is imminent is performed by a pre-crash sensor onboard said vehicles.

3. A method as defined by claim 1 wherein:

said step of exchanging vehicle crash-related information is performed by an electromagnetic wave communication system onboard said vehicles.

4. A method as defined in claim 1 wherein:
said steps of processing and predicting are performed by an onboard computer system.

5. A method as defined in claim 1 wherein:
said first vehicle condition defining signals comprise closing speed of said vehicles and crash characteristics of said first vehicle, said second vehicle condition defining signals comprise closing speed of said vehicles and crash characteristics of said second vehicle.

6. A method as defined in claim 5 wherein:
said first vehicle condition defining signals comprise an angle of approach signal,
said second vehicle condition signal comprises an angle of approach signal.

7. A method as defined in claim 6 wherein:
said angle of approach signal is derived from a global positioning system.

8. A method of controlling the occupant protection devices in each of first and second road vehicles, said method comprising the steps of;
determining whether said vehicles are closing on each other,
if said vehicles are closing on each other, determining whether collision of said vehicles is imminent,
developing, onboard said first vehicle, first vehicle condition-defining signals which represent pre-crash conditions affecting the severity of a crash with another vehicle,
developing, onboard said second vehicle, second vehicle-condition defining signals which represent pre-crash conditions affecting the severity of a crash with another vehicle,
if a collision is imminent, transmitting said first vehicle condition-defining signals from said first vehicle to said second vehicle and transmitting said second vehicle condition-defining signals from said second vehicle to said first vehicle,
processing, onboard said first vehicle, said first and second vehicle condition-defining signals to obtain a first crash-defining data signal,
processing, onboard said second vehicle said first and second vehicle condition-defining signals to obtain a second crash-defining data signal,
predicting onboard said first vehicle the severity of the imminent collision for said first vehicle based upon said first crash-defining data signal and controlling the occupant protection devices onboard said first vehicle in accordance with the predicted severity, and
predicting onboard said second vehicle the severity of the imminent collision for said second vehicle based upon said second crash-defining data signal and controlling the occupant protection devices onboard said second vehicle in accordance with the predicted severity.

9. Apparatus for use onboard a first road vehicle for controlling the deployment of occupant protection devices onboard said first vehicle, said apparatus comprising:
means for determining whether said first vehicle is closing on a second vehicle and for producing a warning signal when a collision of the first and second vehicles is imminent,
means responsive to the warning signal for transmitting first crash-related information to said second vehicle,
means for receiving second crash-related information from said second vehicle,
computer means for processing said first and second crash-related information of both vehicles for predicting the severity of the imminent collision and for controlling deployment of the occupant protection devices in accordance with the prediction.

10. Apparatus as defined in claim 9 wherein:
said means for determining comprises a pre-crash sensor.

11. Apparatus as defined in claim 9 wherein:
said means responsive to said warning signal for transmitting crash-related information comprises an electromagnetic-wave transmitter.

12. Apparatus as defined in claim 9 wherein:
said means for receiving crash-related information comprises an electromagnetic-wave receiver.

13. Apparatus as defined in claim 9 wherein:
said computer means comprises a pre-crash processing computer and a vehicle dynamics computer coupled together.

14. Apparatus as defined in claim 13 comprising:
a computer readable memory device for storing information related to the crashworthiness of said first vehicle,
said memory device being coupled with said computer means.

15. Apparatus as defined in claim 9 comprising:
plural vehicle condition sensors for producing plural vehicle condition-defining signals,
said sensors being coupled with said computer means.

16. Apparatus as defined in claim 9 comprising:
a global positioning system coupled with said computer means for developing position, heading and speed signals of the vehicle.

17. Apparatus as defined in claim 9 in combination with additional apparatus onboard a second road vehicle for controlling the deployment of occupant protection devices onboard said second road vehicle, said additional apparatus comprising:
means for determining whether said second vehicle is closing on said first vehicle and for producing a warning signal when a collision of said first and second vehicles is imminent,
means responsive to the warning signal for transmitting second crash-related information to said first vehicle,
means for receiving said first crash-related information from said first vehicle,
computer means for processing said first and second crash-related information of both vehicles for predicting the severity of the imminent collision and for controlling deployment of said occupant protection devices onboard said second vehicle in accordance with the prediction.

18. A method of predicting the severity of an imminent collision of a vehicle with another object, said method comprising the steps of:
determining that a collision of the vehicle and the object is imminent,
exchanging vehicle crash-related information between said vehicle and said object when an imminent collision is determined, said crash-related information for said vehicle, being represented by vehicle condition-defining signals developed onboard said first vehicle and, for said object, being represented by a crash characteristics signal for said object,
processing onboard said vehicle, said vehicle condition defining signals and said crash characteristics signal from said object to obtain a crash-defining data signal for said vehicle, and
predicting onboard said vehicle the severity of the imminent collision for said vehicle based upon said crash-defining data signal.

* * * * *